(12) United States Patent
Akyildiz et al.

(10) Patent No.: US 10,349,249 B2
(45) Date of Patent: *Jul. 9, 2019

(54) ENVIRONMENT-AWARE CROSS-LAYER COMMUNICATION PROTOCOL IN UNDERGROUND OIL RESERVOIRS

(71) Applicants: Saudi Arabian Oil Company, Dhahran (SA); Truva Corporation, Alpharetta, GA (US)

(72) Inventors: Ian F. Akyildiz, Alpharetta, GA (US); Howard K. Schmidt, Dhahran (SA); Shih-Chun Lin, Alpharetta, GA (US); Abdallah Awadh Al-Shehri, Atlanta, GA (US)

(73) Assignees: Saudi Arabian Oil Company, Dhahran (SA); Truva Corporation, Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/023,814

(22) Filed: Jun. 29, 2018

(65) Prior Publication Data
US 2018/0310151 A1     Oct. 25, 2018

Related U.S. Application Data

(63) Continuation of application No. 15/370,740, filed on Dec. 6, 2016, now Pat. No. 10,117,042.

(Continued)

(51) Int. Cl.
*H04W 4/70*     (2018.01)
*G06F 8/30*     (2018.01)
(Continued)

(52) U.S. Cl.
CPC .............. *H04W 4/70* (2018.02); *G06F 8/30* (2013.01); *H04W 24/02* (2013.01); *H04W 4/38* (2018.02); *H04W 84/18* (2013.01)

(58) Field of Classification Search
CPC ....... H04W 24/02; H04W 4/70; H04W 84/18; H04W 4/38; G06F 8/30
See application file for complete search history.

(56) References Cited

U.S. PATENT DOCUMENTS 7,831,205 B2   11/2010   Jack et al.
8,272,455 B2 *  9/2012   Guimerans ............. E21B 43/24
                                                          175/17
(Continued)

FOREIGN PATENT DOCUMENTS

CN    103441803    12/2013
CN    103701567    4/2014
WO    2015095168   6/2015

OTHER PUBLICATIONS

Agbinya, "A Magneto-Inductive Link Budget for Wireless Power Transfer and Inductive Communication Systems," Progress in Electromagnetics Research C, vol. 37, published in 2013, pp. 15-28.

(Continued)

*Primary Examiner* — Brian D Nguyen
(74) *Attorney, Agent, or Firm* — Fish & Richardson P.C.

(57) ABSTRACT

Example computer-implemented methods, computer-readable media, and computer systems are described for providing communication protocol architecture or framework for magnetic induction (MI)-based communications in wireless underground sensor networks (WUSNs), for example, in underground oil reservoirs. In some aspects, environment information of an underground region that affects the transmission qualities of MI communications is evaluated. A protocol stack is identified. The protocol stack includes a number of layers for MI communications among a number of sensors in a WUSN in the underground region. A cross-layer framework and the distributed protocol are built to (Continued)

jointly optimize communication functionalities of the plurality of layers based on the evaluation.

11 Claims, 14 Drawing Sheets

Related U.S. Application Data

(60) Provisional application No. 62/265,096, filed on Dec. 9, 2015.

(51) Int. Cl.
*H04W 24/02* (2009.01)
*H04W 4/38* (2018.01)
*H04W 84/18* (2009.01)

(56) References Cited

U.S. PATENT DOCUMENTS

| | | | |
|---|---|---|---|
| 8,885,559 | B2 | 11/2014 | Schmidt et al. |
| 9,051,829 | B2* | 6/2015 | Xie ............... E21B 43/2401 |
| 9,129,728 | B2* | 9/2015 | Edbury ............ E21B 43/2401 |
| 9,528,322 | B2* | 12/2016 | MacDonald ........ C10G 21/22 |
| 2005/0152280 | A1 | 7/2005 | Pollin |
| 2009/0222921 | A1* | 9/2009 | Mukhopadhyay ...... G06F 8/30 726/23 |
| 2009/0264067 | A1 | 10/2009 | Pahlavan |
| 2012/0281643 | A1 | 11/2012 | Sun |
| 2013/0043887 | A1 | 2/2013 | Ziolkowski et al. |
| 2013/0091292 | A1 | 4/2013 | Kim et al. |
| 2013/0250812 | A1* | 9/2013 | Rath ............... H04W 24/02 370/255 |
| 2014/0133276 | A1* | 5/2014 | Volker ............. E21B 47/16 367/82 |
| 2014/0366069 | A1 | 12/2014 | Ramamurthi |
| 2015/0036482 | A1 | 2/2015 | Schmidt et al. |
| 2015/0181315 | A1 | 6/2015 | Vuran et al. |
| 2015/0319630 | A1* | 11/2015 | Kerberg ............. H04W 4/70 370/252 |
| 2017/0074093 | A1* | 3/2017 | Adebayo ........... E21B 47/065 |

OTHER PUBLICATIONS

Agbinya, "Investigation of Near Field Inductive Communication System Models, Channels and Experiments," Progress in Electromagnetics Research B, vol. 49, published in 2013, pp. 129-153.
Bell et al., "Subsurface Discrimination Using Electromagnetic Induction Sensors," IEEE Transactions on Geoscience and Remote Sensing, vol. 39, No. 6, Jun. 2001, 8 pages.
Cui et al., "Cross-Layer Energy and Delay Optimization in Small-Scale Sensor Networks," IEEE Transactions on Wireless Communications, vol. 6, No. 10, Oct. 2007, 12 pages.
De et al., "An Integrated Cross-Layer Study of Wireless CDMA Sensor Networks," IEEE Journal on Selected Areas in Communications, vol. 22, No. 7, Sep. 2004, 15 pages.
Gulbahar et al., "A Communication Theoretical Modeling and Analysis of Underwater Magneto-Inductive Wireless Channels," IEEE Transactions on Wireless Communications, vol. 11, No. 9, Sep. 2012, 9 pages.
Karalis, "Efficient Wireless Non-Radiative Mid-Range Energy Transfer," Annals of Physics 323, published in 2008, pp. 34-48.
Kisseleff et al., "Throughput of the Magnetic Induction Based Wireless Underground Sensor Networks: Key Optimization Techniques," IEEE Transactions on Communications, vol. 62, No. 12, Dec. 2014, 14 pages.
Lin et al., "A Tutorial on Cross-Layer Optimization in Wireless Networks," IEEE Journal on Selected Areas in Communications, vol. 24, No. 8, Aug. 2006, 12 pages.
Masihpour et al., "Multihop Relay Techniques for Communication Range Extension in Near-Field Magnetic Induction Communication Systems," Journal of Networks, vol. 8, No. 5, May 2013, 13 pages.
Pompili et al., "A Multimedia Cross-Layer Protocol for Underwater Acoustic Sensor Networks," IEEE Transactions on Wireless Communications, vol. 9, No. 9, Sep. 2010, 10 pages.
Sun et al., "Optimal Deployment for Magnetic Induction-Based Wireless Networks in Challenged Environments," IEEE Transactions on Wireless Communications, vol. 12, No. 3, Mar. 2013, 10 pages.
Vuran et al., "Communication Through Soil in Wireless Underground Sensor Networks—Theory and Practice," published in 2010, pp. 309-347.
Vuran et al., "XLP: A Cross-Layer Protocol for Efficient Communication in Wireless Sensor Networks," IEEE Transactions on Mobile Computing, vol. 9, No. 11, Nov. 2010, 14 pages.
International Search Report and Written Opinion issued in International Application No. PCT/US2016/065165 dated Mar. 3, 2017—new art cited.
Gulf Cooperation Council issued in GCC Application No. GC 2016-32533 on Dec. 6, 2018, 4 pages.

* cited by examiner

| | |
|---|---|
| Transmission range $r$ | $2m$ |
| Room temperature $T_0$ | $293°K$ |
| Operating temperature $T$ | $288°K$ |
| Ratio of paramagnetic composites $p_{para}$ | $0.3$ |
| Ratio of ferromagnetic composites $p_{ferro}$ | $0.1$ |
| Curie constant of Iron $c$ | $0.003$ |
| Magnetic susceptibilities of ferromagnetic contents $\chi_{ferro}$ | $5 \times 10^{-4}$ |
| Magnetic permeability of air in room temperature $\mu_0$ | $4\pi \times 10^{-7} H/m$ |
| Electrical conductivity of oil reservoir in room temperature $\sigma_0$ | $3.4 \times 10^{-8} S/m$ |

| Temperature (T) | Modulation Type | Channel Coding | Chaotic Code Length | Energy [J/bit] | Average Bit Rate [bps] |
|---|---|---|---|---|---|
| 10°C | QPSK | BCH(127, 71, 8) | 4 | 0.9049 | 72.9 |
| 95°C | 16-QAM | BCH(127, 78, 7) | 2 | 0.2348 | 961.7 |
| 500°C | 16-QAM | BCH(63, 57, 1) | 2 | 0.0594 | 1,542.9 |

ENVIRONMENT-AWARE CROSS-LAYER COMMUNICATION PROTOCOL IN UNDERGROUND OIL RESERVOIRS

CROSS-REFERENCE TO RELATED APPLICATIONS

This application is a continuation application of and claims the benefit of priority to U.S. application Ser. No. 15/370,740, filed on Dec. 6, 2016, now issued as U.S. Pat. No. 10,117,042 on Oct. 30, 2018, which claims priority to U.S. Provisional Application Ser. No. 62/265,096, filed on Dec. 9, 2015, the contents of which are hereby incorporated by reference.

TECHNICAL FIELD

This disclosure relates to communication protocols in underground oil reservoirs.

BACKGROUND

Wireless underground sensor networks (WUSNs) have attracted high attention for their great variety of novel applications, such as underground soil condition and power grid monitoring, mine disaster prevention and rescue, oil gas extraction, earthquake and landslide forecast, border patrol and security, and many more other applications. Unlike typical wireless sensor networks that place wireless sensors in terrestrial environments, WUSNs include wireless sensors in underground environments. The techniques for the typical terrestrial wireless sensor networks may not be (or are not) directly applicable to WUSNs due to the significant differences between the communication media (for example, between the soil and air).

SUMMARY

This disclosure relates to communication protocols in underground oil reservoirs.

In general, example innovative aspects of the subject matter described here can be implemented as a computer-implemented method, implemented in a computer-readable media, or implemented in a computer system, for communication protocol design in underground oil reservoirs.

One computer-implemented method includes evaluating environment information of an underground region that affects the transmission qualities of magnetic induction (MI) communications; identifying a protocol stack including a plurality of layers for MI communications among a plurality of sensors in a wireless underground sensor network (WUSN) in the underground region; and building a cross-layer framework to jointly optimize communication functionalities of the plurality of layers based on the evaluation.

This, and other aspects, can include one or more of the following features. The protocol stack is a three-layer protocol stack that includes a physical layer, a data link layer, and a network layer.

In some aspects, the cross-layer framework is realized by an environment-aware protocol (DEAP) process based on the evaluation. The DEAP process includes one or more of: a distributed power control; an evaluation of a multiple access scheme for a data link layer of the protocol stack; or a two-phase decision process for performing a routing algorithm for a network layer of the protocol stack.

Another computer-implemented method includes identifying, by each of a plurality of sensors in a wireless underground sensor network (WUSN) in an underground region, a plurality of environment-dependent parameters measured by the plurality of sensors; identifying, by each of the plurality of sensors, respective communication functions for a plurality of layers of a protocol stack for magnetic induction (MI) communications among the plurality of sensors in the WUSN in the underground region; identifying, by each of the plurality of sensors, an optimization problem for jointly optimizing the respective communication functions of the plurality of layers of the protocol stack based on the plurality of environment-dependent parameters, the optimization problem including a plurality of transmission parameters defining the respective communication functions of the plurality of layers of the protocol stack; determining, by each of the plurality of sensors, the plurality of transmission parameters by solving the optimization problem; and transmitting, by each of the plurality of sensors based on magnetic induction, signals using the plurality of transmission parameters defining the respective communication functions of the plurality of layers of the protocol stack.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

For example, a system comprising a WUSN that includes a plurality of sensors in a wireless underground sensor network (WUSN) in an underground region. Each of the sensor can include memory and data processing apparatus configured to perform the above-mentioned computer-implemented method in a distributive manner.

The foregoing and other implementations can each optionally include one or more of the following features, alone or in combination:

In some aspects, the protocol stack is a three-layer protocol stack that includes a physical layer, a data link layer, and a network layer.

In some aspects, where identifying a communication function for each layer of a protocol stack comprises: identifying a direct sequence code division multiple access (DS-CDMA) scheme as a multiple access scheme for the data link layer; and identifying a geographic routing algorithm as a routing scheme for the network layer.

In some aspects, where solving the optimization problem comprises one or more of: performing a distributed power control based on a non-cooperative game theory; evaluating a relation between a chaotic code of the DS-CDMA scheme and a link throughput for the data link layer of the protocol stack; or identifying a forwarder for a transmitter of a transceiver coil pair according to the geographic routing algorithm by performing a two-phase decision process.

In some aspects, where the plurality of environment-dependent parameters comprises a temperature, an electrical conductivity, a magnetic permeability, and a coil resistance.

In some aspects, the method further comprises evaluating effects of the plurality of environment-dependent parameters on quality of the MI communications among the plurality of sensors in the underground region.

In some aspects, where the transmission parameters comprise one or more of a modulation scheme, a coding scheme, a transmitted power level, a data rate, a coding length of chaotic code, or a next-hop packet forwarder.

In some aspects, where the optimization problem further comprises one or more communication constraints based on a quality of service requirement, a power control requirement, or both.

In some aspects, where the optimization problem comprises a multi-objective optimization problem, an application-driven optimization problem, or a combination of a multi-objective optimization problem and an application-driven optimization problem by a weight sum.

In some aspects, the optimization problem includes one or more optimization objectives that comprise minimum energy consumption, maximum network throughput, or both.

In some aspects, the method further comprises performing a random access scheme when the transmitting of the signals fails.

Units of Measurements:

| | |
|---|---|
| m | Meter |
| cm | Centimeter |
| S/m | Siemens per meter |
| H/m | Henry per meter |
| Ω/m | Ohm per meter |
| °K | Kelvin |
| Hz | Hertz |

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description in the following. Other features and advantages of the disclosure will be apparent from the description and drawings, and from the claims.

BRIEF DESCRIPTION OF THE DRAWINGS

FIG. 11 is a table showing example parameter setup for comparison between the example cross-layer framework and layered BPSK/No FEC scheme under various environmental conditions in underground oil reservoir environment.

FIG. 14 is a table showing example performance evaluation of the example framework cross-layer under sea water condition in underground oil reservoirs.

Like reference numbers and designations in the various drawings indicate like elements.

DETAILED DESCRIPTION

Figure 1:
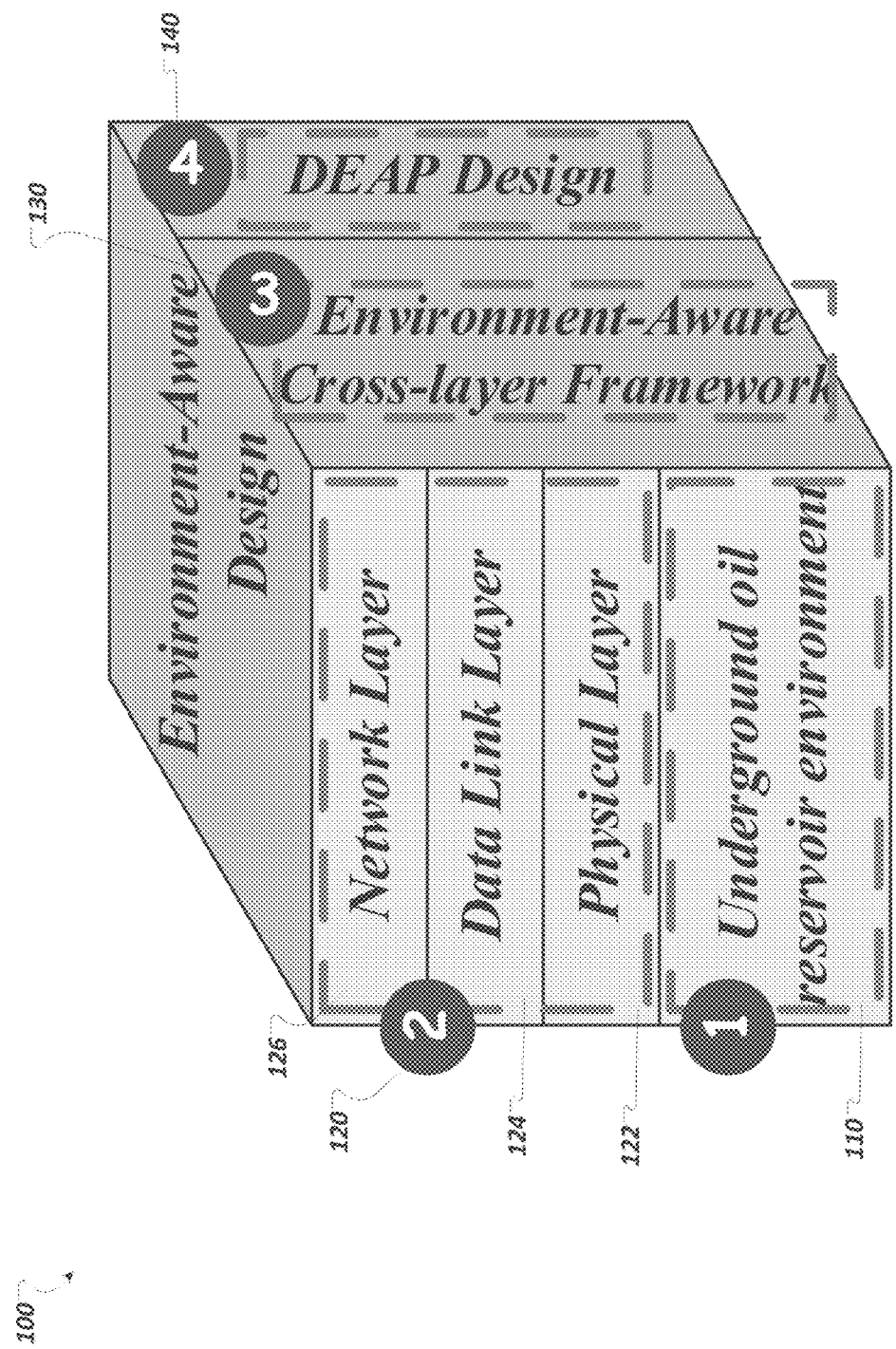
FIG. 1 is a diagram showing an example protocol stack of environment-aware cross-layer protocol design.

This disclosure describes computer-implemented methods, software, and systems for providing communication protocol architecture or framework for magnetic induction (MI)-based communications in wireless underground sensor networks (WUSNs), for example, in underground oil reservoirs.

Underground environments create significant challenges for wireless communication via classical electromagnetic (EM) waves. For example, the main problems of EM communication arise from extremely short communication ranges, highly unreliable channel conditions, and large antenna sizes, thus making them impractical for actual deployments of WUSNs.

The magnetic induction (MI) technique is a promising alternative wireless communication solution to handle the underground challenges. The MI technique utilizes the near magnetic field of coils to propagate the information, thus achieving constant channel conditions via small-size coils and making the MI communication suitable for underground environments.

In some implementations, instead of taking the classical layered protocol approach (for example, the 7-layer Open Systems Interconnection model (OSI Model)), a cross-layer framework is proposed for WUSNs in underground oil reservoirs. For example, the cross-layer framework can include a three-layer protocol stack. In some implementations, the cross-layer framework can be implemented in a distributed manner to optimize MI communication in WUSNs, for example, to jointly optimize the communication functionalities of different layers. Distributed Environment-Aware Protocol (DEAP) framework is an example distributed cross-layer protocol framework. Furthermore, a DEAP process is provided to solve the proposed cross-layer framework.

In some implementations, the distributed cross-layer framework such as DEAP framework can account for environment information of underground oil reservoirs that affects the transmission qualities of MI-based communications. For example, MI channel models are developed that capture the physical layer functionalities. The effects of temperature, electrical conductivity, magnetic permeability, and coil resistance on the MI-based communication (for example, the path loss, the bandwidth, and the interference) are studied and accounted for in distributed cross-layer protocol framework. Furthermore, the communication functionalities, such as modulation and forward error coding, medium access control (MAC), routing algorithms, and the statistical quality of service (QoS, for example, packet delay and transmission reliability) guarantees and their impacts on MI-based communications are studied. The interactions of key underground communication functionalities as well as the QoS requirements of applications are investigated and taken into consideration of the distributed cross-layer protocol framework.

In some implementations, the cross-layer framework can provide solutions to various performance requirements (for example, QoS requirements) of diverse applications. In some implementations, the Pareto optimality can be considered for two-objective functions such as energy consumption and packet transmitted rate. The weighted sum method further can convert the optimization into a single objective problem via the specific weight vectors of applications. A distributed power control via a non-cooperative game is designed and a direct sequence code division multiple access (DS-CDMA) scheme can be employed via a chaotic code and a geographical routing algorithm can be utilized by a two-phase decision strategy.

The example techniques can achieve one or more advantages. For example, the cross-layer framework can integrate these functionalities for the efficient utilization of the bandwidth-limited MI communication channels. The DEAP process can follow the cross-layer framework in a distributed manner, delivering statistical QoS guarantee and obtaining both optimal energy savings and throughput gain concurrently for practical implementation. The cross-layer framework can fulfill a pre-defined level of QoS and take into account interactions of different layers' functionalities. The cross-layer framework can provide efficient resource utilization and achieve high system performances such as high energy savings and throughput gain with low computation complexity. The cross-layer framework can serve as a foundation for other designs of distributed cross-layer scheme in WUSNs. The example techniques can be applicable to general wireless underground applications with various requirements in different communication layers due to the supported reliable and efficient MI communications. In some applications, the example techniques can achieve additional or different advantages.

Simulation results show that cross-layer framework outperforms the layered protocol solutions with 50% energy savings and 6 dB throughput gain. Moreover, beyond the centralized cross-layer designs, the distributed cross-layer framework includes two-phase-per-node-based decisions that requires only one-hop neighbor information, and has low computation complexity. Thus, the distributed cross-layer design for MI communication in WUSNs establishes reliable and efficient transmissions in challenged underground environments.

FIG. 1 is a diagram showing an example architecture 100 of a cross-layer protocol framework. The cross-layer framework architecture 100 includes evaluations of underground oil reservoir environment 110. A three-layer protocol stack 120 is proposed for WUSNs in the underground oil reservoir environment 110. The three-layer protocol stack 120 can model MI-based communications in the underground oil reservoir environment 110 with environment-aware functionalities of each protocol layer. The three-layer protocol stack 120 includes a physical layer (PHY) 122, a data link layer (DLL) 124, and a network layer (NET) 126. Functionalities of each layer can be evaluated to design, improve, optimize, or otherwise manage MI-based communications. For example, several modulation schemes such as BPSK, QPSK, and BFSK can be adopted to reduce energy consumption. Channel coding like the multilevel cyclic BCH code can be considered. Moreover, a Direct-Sequence CDMA (DS-CDMA) can be designed and used to simplify performance degradation caused by interference signals.

An environment-aware cross-layer framework 130 can take into account the environment information from the underground oil reservoir environment 110, and can capture functionalities of each protocol layer of the three-layer protocol stack 120. A DEAP process 140 can be performed to solve the optimization problem of the framework in a distributed manner. As such, the cross-layer framework architecture 100 shows a coherent cross-layer framework is provided that can accurately model the layered network architecture and integrate different communication functionalities into a coherent framework, and provide cross-layer resource allocation and distributed cross-layer solutions.

For example, to achieve efficient MI communication in the underground environment, a distributed optimization problem can be performed to jointly control the physical, MAC and routing functionalities in the physical layer (PHY) 122, data link layer (DLL) 124, and network layer (NET) 126, respectively. Suitable or optimal selection of modulation, FEC, and transmit power (physical functionalities), a DS-CDMA medium access control scheme with power control constraint to access the bandwidth-limited MI channels (MAC functionality), and a geographical routing algorithm (routing functionality). Furthermore, the cross-layer DEAP solution is environmental-aware in capturing the underground MI channels and can provide high utilization and achieve low energy consumptions and limited computational complexity in WUSNs.

Figure 2:
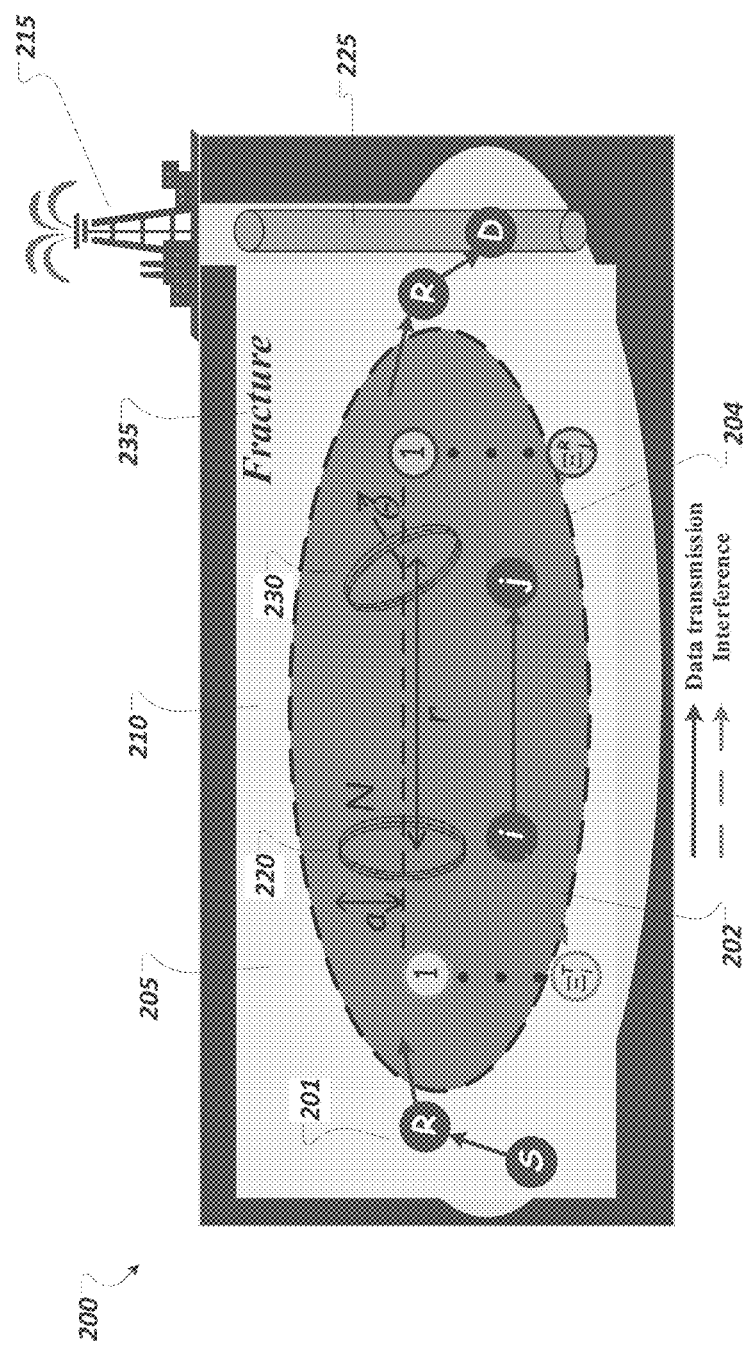
FIG. 2 is a plot showing an example network topology of multi-hop transportation for WUSNs in underground oil reservoirs.

FIG. 2 is a plot showing an example system model 200 of MI-based communication for WUSNs in underground oil reservoir 205. In some implementations, a well system 215 can be implemented on the land in a subterranean region, for example, to perform fracture treatments in order to produce oil and gas from underground oil reservoir 205. A borehole 225 can be formed beneath the land surface and fractures 235 can be formed in the underground oil reservoir 205.

Multiple miniaturized sensors (e.g., sensors S, Rs, i, j, and D) can be placed in the underground oil reservoir 205 that form one or more WUSNs for measuring conditions of the underground environment. The sensors can measure temperature, pressure, local fluid composition, chemical compositions, or other environment information of the underground oil reservoir 205. Some or all of environment information, as well as the sensor location information, can be communicated over the WUSN among the multiple sensors, for example, based on MI communications. In some implementations, one or more or all of the sensors can be placed or injected in deep soil regions at depths of substantially 6,000 feet (for example, substantially 2.0 kilometers). The sensors can be placed in the deep soil, for example, by entraining the sensors in a fluid and flowing the fluid into the rock formation, for example, to a natural void in the rock (such as a lost circulation zone) or a new void (such as a hydraulic fracture).

An MI communication link can be formed by the induction between a primary coil and a secondary coil, as an alternating current exists in the primary coil. In some implementations, each sensor in the WUSN can include, be attached to, or otherwise be associated with a coil as an antenna for MI communication. For example, a sensor can be an integrated sensor that has an embedded coil antenna or a sensor with external (attached) coils. Each sensor can include memory, a processor, or other computer-readable media or data processing apparatus operable to perform the example techniques for providing communication protocol architecture or framework for MI-based communications in the WUSN. For example, the sensors can include memory and processors for performing the example processes 400, 500, 600, and 600 in a distributive manner. In some implementations, the sensors in the WUSN can include communication interfaces for establishing communications (e.g., radio frequency communications or Bluetooth communications) with a computer system of the well system 215. The MI communication link can be implemented to communicate at low frequencies (for example, tens of megahertz (MHz) or lower, such as, 7 MHz) using small size coils as antennas to increase stability in the channel condition for good transmission quality. The computer system can be located near the underground oil reservoir 205 or remotely in a computing center or facility. In some implementations, some or all of the example techniques described in this disclosure (for example, the example processes 400, 500, 600, and 600 can be implemented by the computer system in a centralized manner.

The MI communications can include single-hop and multi-hop transportations. For example, an end-to-end MI transmission can include more than two coils along the transmission route. FIG. 2 shows an example multi-path data transportation 201 that includes a source sensor (S) one or more relay sensors (Rs), and a destination sensor (D). S sends the data, Rs relay the data through multiple single-hop transmissions, and D receives the data for further data processing. The two coils 220 and 230 are an example single transceiver pair.

FIG. 2 also shows an example single-hop transmission between two sensors i and j, where the sensor i is the transmitter and sensor j is the receiver. The sensors i and j include a transmitter coil i 220 and a receiver coil j 230, respectively, forming a transceiver coil pair i-j 210. The coils 220 and 230 can have the same radius a [cm] and number of turns N in this example. The primary coil and secondary coil can have different radius and number of turns in other instances. r [m] is the distance between the transmitter coil 220 and the receiver coil 230 and Θ is the angle between the axes of two coupled coils 220 and 230.

In some instances, when sensor i transmits the signal, not only the target receiver j will receive the signal but also other sensors, such as, sensors 1, ..., sensor $\Xi_i^T$, may receive the interference from sensor i. Similarly, when sensor j receives the signal, it may receive not only the desired signal from transmitter i but also the interference from other transmitters, such as, sensor 1, ..., sensor $\Xi_j^R$. The directions of arrows 202 and 204 show the directions of single-hop transmissions.

In some implementations, the constant channel conditions of small-size coils make MI communication suitable for underground environments. These environment parameters can affect the communication qualities of magnetic induction, which is used by each transmitter-receiver pair for MI communications. For example, the temperature can drive the MI-based communications. The local fluid composition correlates with conductivity, dielectric constant, or both. The sensor locations can be used for mapping the fractures 235 of the underground oil reservoirs 205. These environment parameters' impact on the MI-based communication can be evaluated and used to provide environment-aware cross-layer framework (for example, framework 130) for the WUSN.

Figure 3:
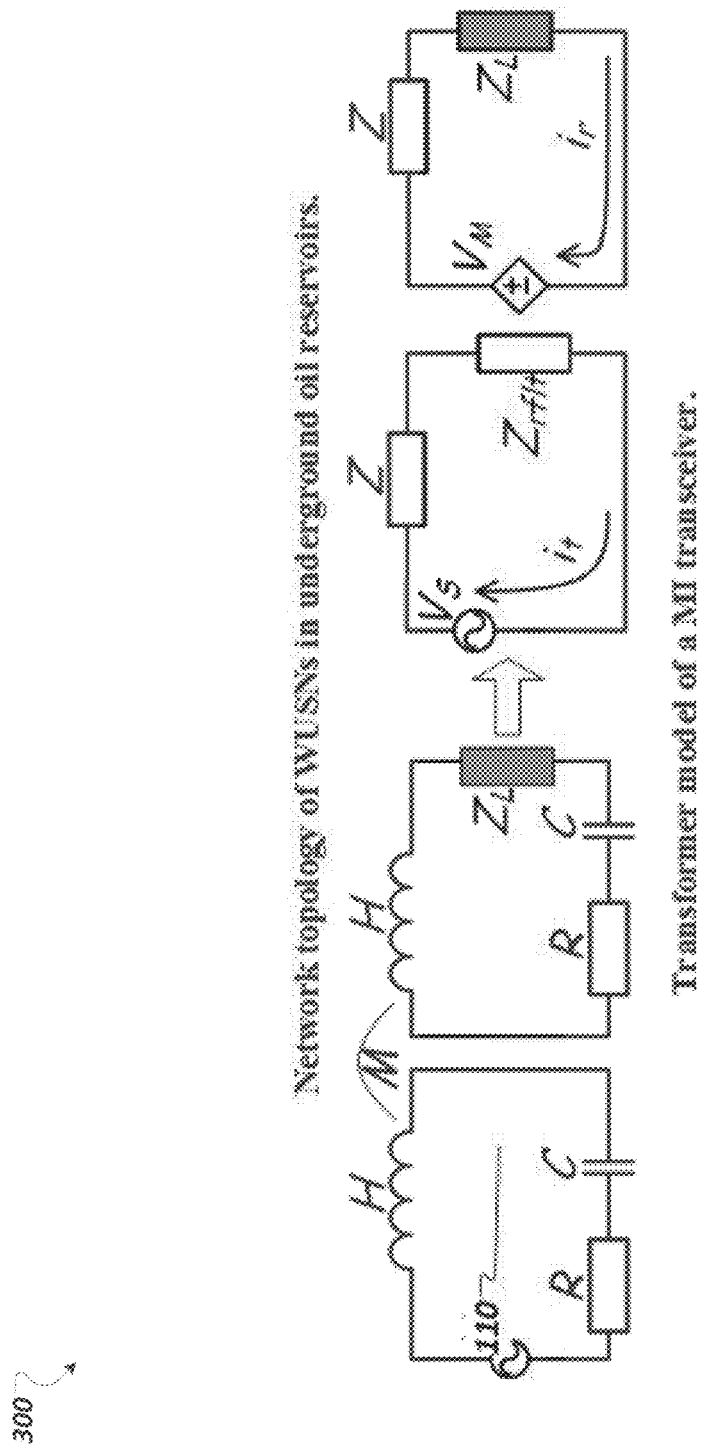
FIG. 3 is a plot showing an example transformer model and the equivalent circuit of the example transceiver coil pair i-j shown in FIG. 2.

FIG. 3 is a diagram showing an example system model 300 and the equivalent circuit 350 of the example transceiver coil pair i-j 210 in FIG. 2. The system model 300 can model physical magnetic induction transmissions for underground oil reservoirs. As shown in the example system model 300, the MI transceiver 210 can be modeled as two transformers 310 and 320, where $V_S$ is the voltage of transmitter's battery, $Z_L$ is the receiver's load impedance, M is the mutual induction between two coils 220 and 230, R is the resistance of copper coil, H is the self-induction of magnetic antenna (that is, coil), and C is the loaded capacitor to guarantee resonance. Furthermore, the equivalent circuit of such a model can also obtained as $$Z=R+j\omega H+1/(j\omega C),$$

$$Z_{rfit}=\omega^2 M^2/(Z+Z_L);$$

$$V_M=j\omega M i_r$$

where ω is the angle frequency of the transmitting signal and it is the current of transmitter's circuit.

Figure 4:
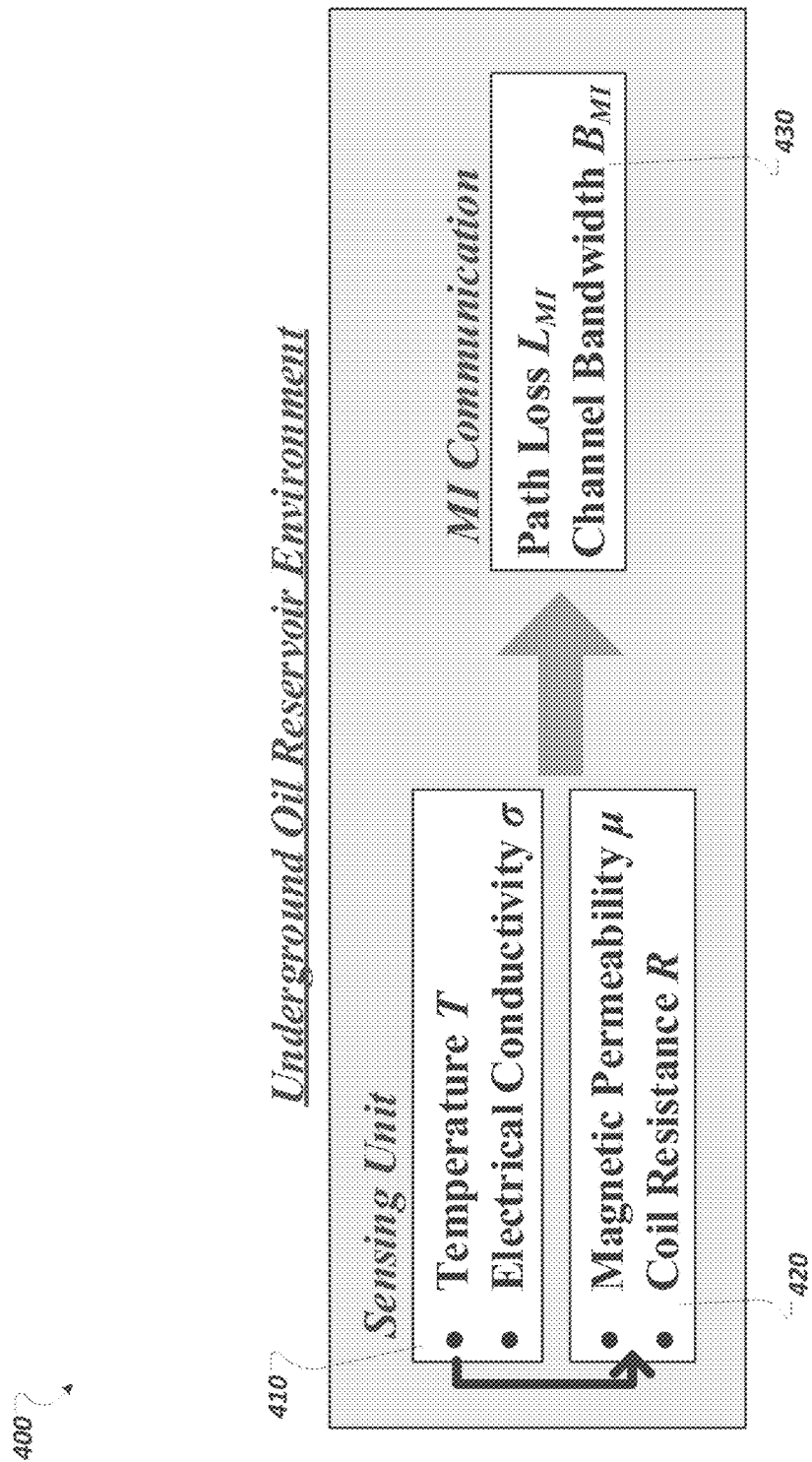
FIG. 4 is a flow chart of an example process of underground oil reservoir environment evaluation.

FIG. 4 is a diagram of an example process 400 of underground oil reservoir environment evaluation. In some implementations, underground oil reservoir environment evaluation includes measurements of the temperature, electrical conductivity, magnetic permeability, coil resistance or other environment conditions or parameters of a WUSN in an underground oil reservoir, and evaluation of the path-loss and bandwidth for the MI-based communication.

In some implementations, to fit the environment-aware design for underground oil reservoirs, at 410, the operating temperature T and electrical conductivity of medium a are measured, for example, by each sensor in the WUSN. The temperature refers to the temperature of a specific location where the sensor positioned. It can be used to characterize the communication quality of MI-based communications.

At 420, magnetic permeability of medium and coil resistance can be calculated based on the environment parameters. For example, the magnetic permeability and the coil resistance can be calculated as follows:

$$\mu = \mu_0(1+\chi) = \mu_0\left(1 + p_{para}\frac{\hat{c}}{T} + p_{ferro}\chi_{ferro}\right)$$

$$R = 2\pi a N R_0[1+ac_u(T-T_0)]$$

where $\mu_0$ is the permeability of air, that is, $\mu_0=4\pi*10^{-7}$ [H/m], χ and $\chi_{ferro}$ are the magnetic susceptibilities of the medium and ferromagnetic contents, $p_{para}$ and $p_{ferro}$ are the ratio of paramagnetic and ferromagnetic composites, $\hat{c}$ is the constant, $\alpha_{Cu}=3.9*10^{-3}$ [/° K.] is the temperature coefficient of copper coil, T [° K.] is the actual underground temperature and $T_0$[° K.] and $R_0$ [Ω/m] are the room temperature and the corresponding resistance of a unit length of coil.

At 430, the path loss and available transmission bandwidth can be calculated or otherwise evaluated based on the operating temperature T and electrical conductivity of medium σ, magnetic permeability of medium and coil resistance. For example, according to circuit theory with the example coil model 300 in FIG. 3, the path loss can be obtained as $$L_{MI}(r, f_0, \theta, T, \sigma)[dB] = 10lg\frac{2(2R^2+\omega_0^2 M^2)}{\omega_0^2 M^2}$$

where $f_0$ [MHz]$=\omega_0/2\pi$ is the frequency of transmitted signal and M is the mutual induction of transmitter's and receiver's coils. The 3-dB bandwidth $B_{MI}$ [KHz] is adopted as the MI channel bandwidth. Specifically, the path loss at $f_0+0.5B_{MI}$ can be twice of that at $f_0$. Since the channel bandwidth is much smaller than the central frequency (that is, $f_0+0.5B_{MI} \approx f_0$), the approximated bandwidth can thus be obtained as $$B_{MI} = \frac{R(\sqrt{2}-1)}{\mu\pi^2 aN^2}.$$

In some implementations, the path loss and available transmission bandwidth can be evaluated under different parameter settings as these environment-dependent parameters affect the transmission quality of MI-based communication.

In some instances, the environment parameters vary over time, the sensors can measure the temperature periodically, continuously, from time to time, or in real time. In some implementations, the environment-aware cross layer protocol frame can make decision based on these environment-dependent parameters and update over time based on the changes of the sensed parameters.

Figure 5:
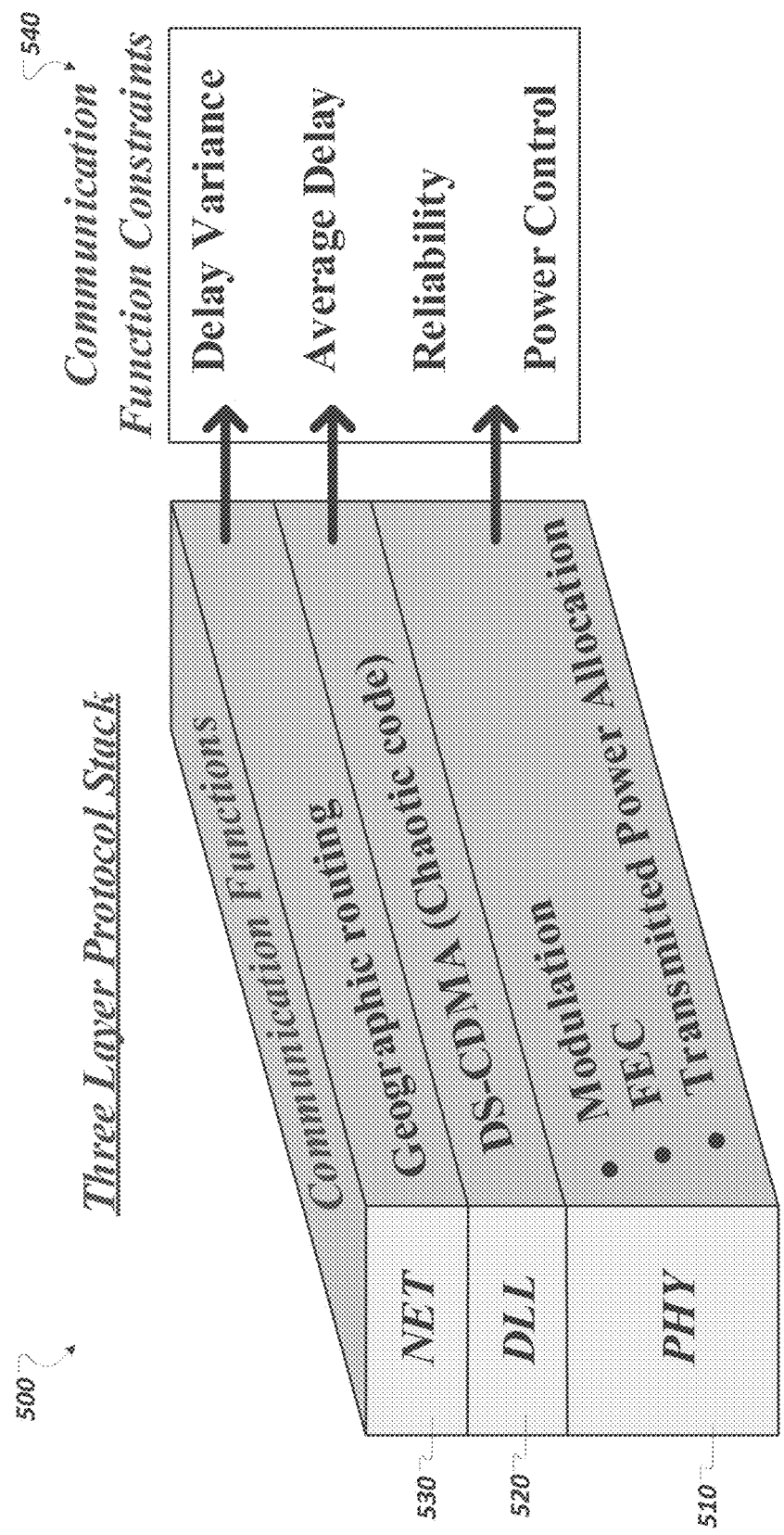
FIG. 5 is a flow chart of an example process of three layer protocol stack for WUSNs in underground oil reservoirs.

FIG. 5 is a diagram showing of an example environment-aware protocol stack 500 for WUSNs in underground oil reservoirs process. The example environment-aware protocol stack 500 is a three-layer protocol stack, rather than conventional seven-layer stacks (for example, the OSI model) to save the energy consumption due to protocol processing. The three-layer protocol stack 500 includes a physical layer (PHY) 510, a data link layer (DLL) 520, and a network layer (NET) 530.

In some implementations, the PHY 510 and DLL 520 are necessary for successful communications of each transmitter-receiver pair (that is, point-to-point communications) in underground environments. The NET 530 is responsible for packet transmission from source to destination (that is, end-to-end communications), for example, with routing algorithms. The three-layer protocol stack 500 can reduce the implementation and computational costs of sophisticated design of higher layers of the OSI model (for example, Transport Layer, Session Layer, Presentation Layer, Application Layer).

For each layer, the communication functions are built with the consideration of the environment information. The communication functions of PHY 510 include, for example, modulation, channel coding (for example, forward error correction (FEC)), and transmitted power allocation. The communication functions of DLL 520 include, for example, multiple accesses according to certain multiple access schemes (for example, DS-CDMA or other multiple access schemes). The communication functions of NET 530 include, for example, routing packets according to certain routing algorithms (for example, geographical routing algorithm or other algorithms).

In some instances, the DS-CDMA scheme that uses chaotic codes can compensate the drawbacks of multi-path effects and achieve high channel reuse as well as low number of packet retransmissions. Thus, it decreases the energy consumption and increases the network throughput. As chaotic codes provide much higher granularity with less constraint in code properties than the pseudo-random sequences, the chaotic code with length $l_{ij}$ [bit] $\in L = [l_{min}, l_{max}]$ can be adopted for transmissions over link i-j.

While DS-CDMA allows multiple transmitters to transmit at the same time, the transmitter near the receiver will have higher received power level than the one far from the receiver. This causes the near-far problem if the near transmitter is not the target sender of the receiver and will induce high interference for the transmissions from the target sender/transmitter. To implement DS-CDMA in WUSNs for underground oil reservoirs, the near-far effect needs to be addressed, for example, to make signals arrived at the receiver to have approximately the same mean power. In some instances, the interferences from simultaneous transmissions of different users need to be controlled. In some implementations, these requirements can be satisfied by proper power control design.

In some implementations, for the network layer, a geographical routing algorithm can be used because of its scalability feature and limited signaling overhead requirements. The geographical routing algorithm is a distributed algorithm. A source or relay node i can select its best next hop j* among the set of possible forwarders given an objective function, such as an energy consumption threshold, an achievable throughput, or a combination of these and other objectives.

In some implementations, with the built communication functions for each layer, communication constraints (also referred to as constraints of communication functions) 540 can be determined based on required quality-of-service (QoS) and power control. The communication constraints can include, for example, power control constraint, reliability constraint, average delay constraint, and delay variance constraint.

Figure 6:
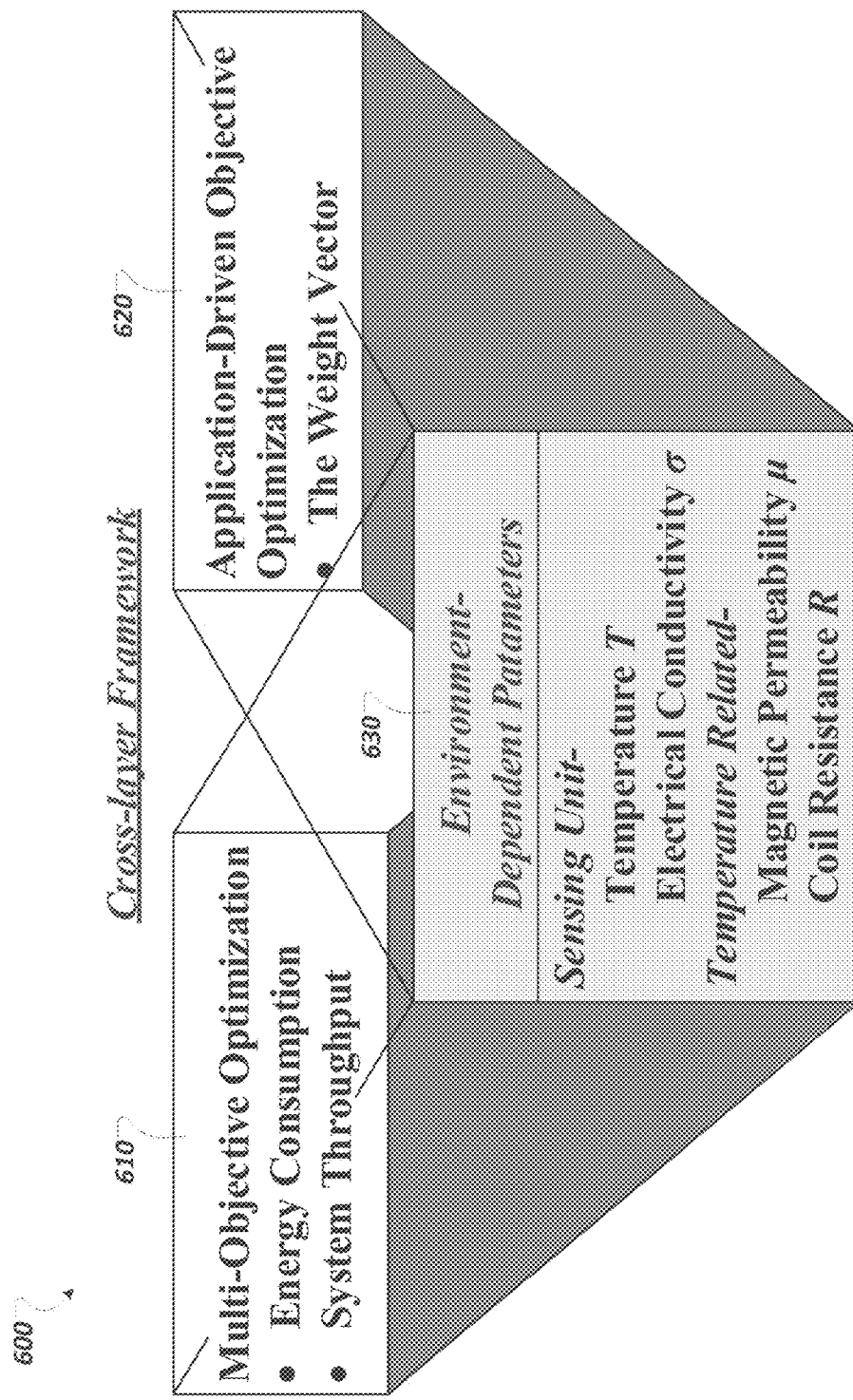
FIG. 6 is a diagram showing an example cross-layer framework for WUSNs in underground oil reservoirs.

FIG. 6 is a diagram showing an example cross-layer framework 600 for WUSNs in underground oil reservoirs. The example cross-layer framework 600 can include multi-objective optimizations 610 and application-driven objective optimization 620 to be performed individually, sequentially, or in parallel.

In some implementations, the multi-objective optimizations 610 can include a two-objective optimization with respect to the energy consumption and the network throughput, which are the two key factors for the energy-efficient and reliable communications. For example, the multi-objective optimizations 610 can aim for both optimal energy consumption and system throughput. In some implementations, for multi-objective optimizations, the Pareto optimal front can provide the best solution sets that include non-dominated solutions, and thus gives the performance benchmarks. The Pareto optimal front is the line that shows all possible values of studied parameters can be achieved at the same time. In this example two-objective optimization, the Pareto optimal front describes a 2-tuple parameter, (achievable throughput, consumed energy). When the consumed energy increases or decreases, the achievable throughput will increase or decrease, respectively.

On the other hand, application-oriented WUSNs usually have their own purposes, such as sensing the scalar data in harsh environments or monitoring the objects with high data rate requirements accompanied by possible build-in energy harvesting. In some implementations, the application-driven objective optimization 620 can be jointly considered with the multi-objective optimizations 610, for example, via a weighted sum method. The weighted sum method can apply a weight vector to multiple applications that are considered at the same time. For example, the multi-objective optimization framework 610 can be set with the objectives of energy minimization and throughput maximization, subject to the obtained communication constraints determined at

540. To minimize energy consumption E and maximize throughput Q at the same time, the weighted sum method can be applied to minimize $w_1E-w_2Q$, where $w=[w_1\ w_2]$ is a weight vector that can be pre-determined according to the preference of energy or throughput performance. As such, the multi-objective framework 610 is converted to application-driven objective optimization 620 through the weight vector that optimizes energy consumption and achievable throughput at the same time. Additional or different optimization objectives can be determined, for example, by a user's application of WUSN before deploying the sensors. In some implementations, the user's applications determine the weight vectors and the weighted sum method can be applied according to weight vectors, transforming multi-objective optimization to single-objective optimization.

In some implementations, the optimizations (for example, the optimization 610, 620, or both) can be achieved by adjusting the corresponding transmission parameters based on the environment-dependent parameters. In some implementations, adjusting the transmission parameters can include updating or otherwise determining values or modes of the transmission parameters to achieve certain objectives (such as a maximum throughput and a minimum energy consumption). The transmission parameters can be determined by solving an optimization problem. For example, the transmission parameters can be determined by solving an optimization problem with the identified multiple objectives and subject to the communication constraints. The transmission parameters include, for example, modulation and coding schemes, applied power level, achievable data rates, coding length of a chaotic code for DS-CDMA, and the next-hop packet forwarder. The cross-layer framework 600 enables the adjustment of transmission parameters based on environment-dependent parameters (for example, magnetic permeability and coil resistance, particularly the measured temperature and electrical conductivity).

In some implementations, in the proposed cross-layer framework, the transmission parameters can be determined for each transmitter-receiver pair (for example, the transceiver coil pair i-j 210) before the transmitter transmits its packets. In some implementations, the transmission parameters can be determined based on the real-time values of environment-dependent parameters. In this way, the communication quality can be estimated and optimized dynamically, for example, before the actual transmissions take place.

In some implementations, the optimizations (for example, the optimization 610, 620, or both) can be implemented as a software module that decides the best transmission parameters among the communications of underground sensors. The software module can be implemented in each of the sensors in the WUSNs. In some implementations, the software module can be implemented in one or more computer system in addition to the sensors in the WUSNs.

Figure 7:
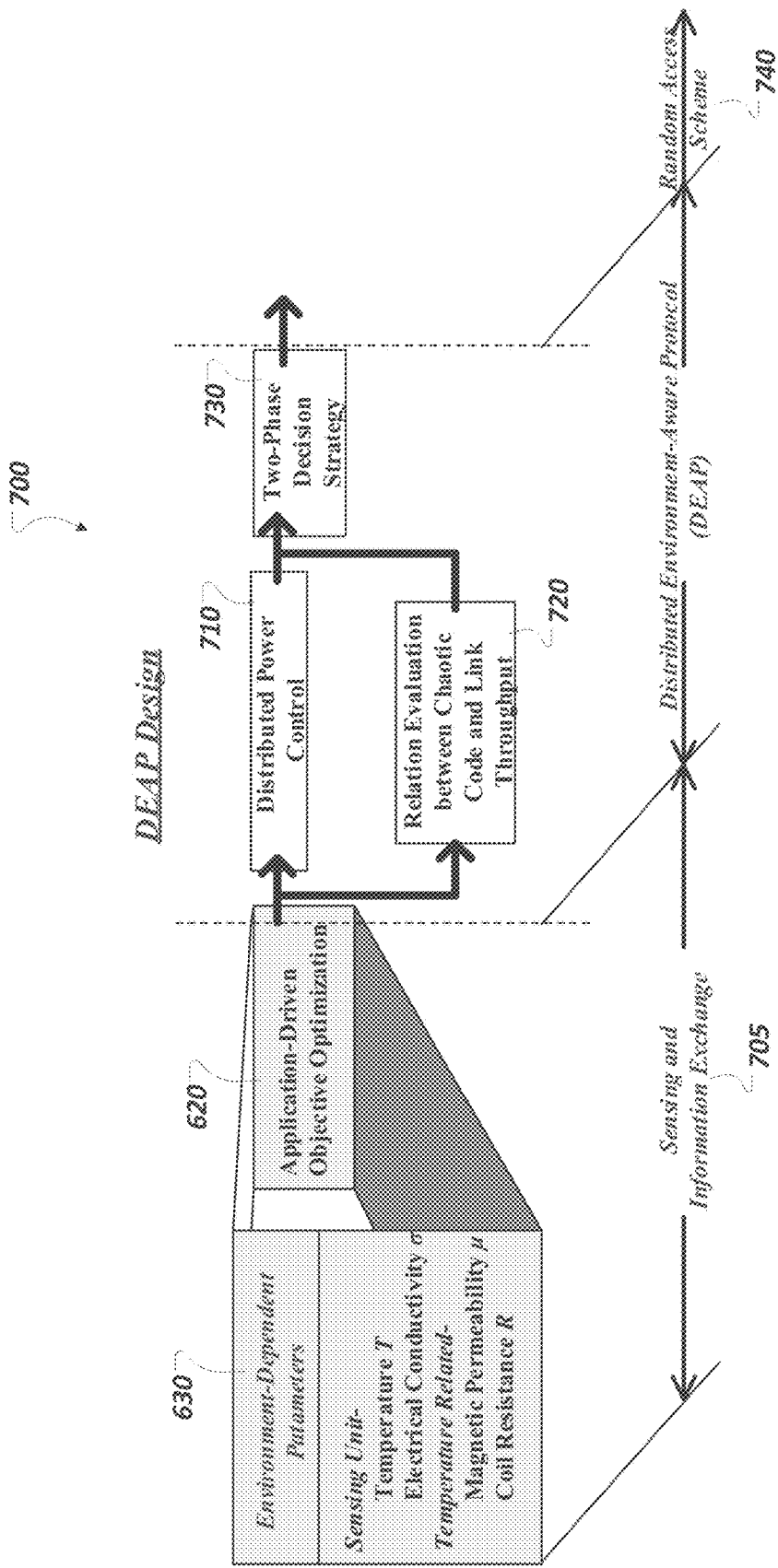
FIG. 7 is a diagram showing an example Distributed Environment-Aware Protocol (DEAP) design for solving cross-layer framework in underground oil reservoirs.

FIG. 7 is a diagram showing an example Distributed Environment-Aware Protocol (DEAP) process 700 for solving a cross-layer framework in underground oil reservoirs. In some implementations, the DEAP process 700 can be performed to solve the application-driven objective optimization 620 of the cross-layer framework 600. In some implementations, the DEAP process 700 can be performed on a per node or sensor basis. The DEAP process 700 can include distributed power control 710, relation evaluation between a chaotic code and a link throughput 720, and two-phase decision strategy 730 for the actual transmission between each transmitter-receiver pair.

The DEAP process 700 can be performed after a sensing and information exchange phase 705 where the environmental information (for example, the four environment-dependent parameters 630) is collected and determined, for example, based on measurements from sensors in the WUSN. The sensing and information exchange phase 705 can be similar to or different form the example process 400 of underground oil reservoir environment evaluation.

The distributed power control 710 can solve the near-far problem of the DS-CDMA scheme, for example, based on the non-cooperative game theory. In other words, the distributed power control 710 can be formulated as a game problem and solved with the aid of game theory techniques. As an example, the inputs to the game problem can include utility functions of a sensor, such as:

$$u_i(p_i,p_{-i})=R_i(p_i,p_{-i})-C_i(p_i,p_{-i})$$

where strategy $p_i$ of sensor i represents the transmitted power level, strategy $p_{-i}$ represents other sensors' power levels, the revenue function $R_i$ represents the achievable data rate that relates to received signal to noise and interference ratio (SINR) level, and the cost function $C_i$ represents the instantaneous price that sensor i pays for using a specific amount of power that causes interference to other ongoing transmissions.

In some implementations, the game theory can be applied to yield an optimal solution in a distributed manner. For example, the game theory problem can be solved by each sensor individually for its own transmitted power. The existence and the uniqueness of Nash Equilibrium in this distributed power control game can be examined that derives the best suitable power level for each sensor. The derived power level can then be programmed inside sensors as power control policies.

The relation evaluation 720 facilitates the implementations of the cross-layer framework in a distributed manner. There is no signaling needed to optimize the transmission parameters and each sensor can decide those parameters locally. The relation evaluation 720 can assess the relation between a chaotic code and a link throughput, for example, when applying DS-CDMA for DLL layer according to the example techniques described with respect to FIG. 5. In some implementations, the relation between a chaotic code and a link throughput can be characterized by a function whose output is a link throughput and whose inputs have a chaotic code length. For example, the link throughput $Q_{ij}$ can be modeled as:

$$Q_{ij}=f(l_{ij},T,\sigma,\ldots),$$

where $l_{ij}$ denotes code length, T temperature, and $\sigma$ electrical conductivity.

Figure 10:
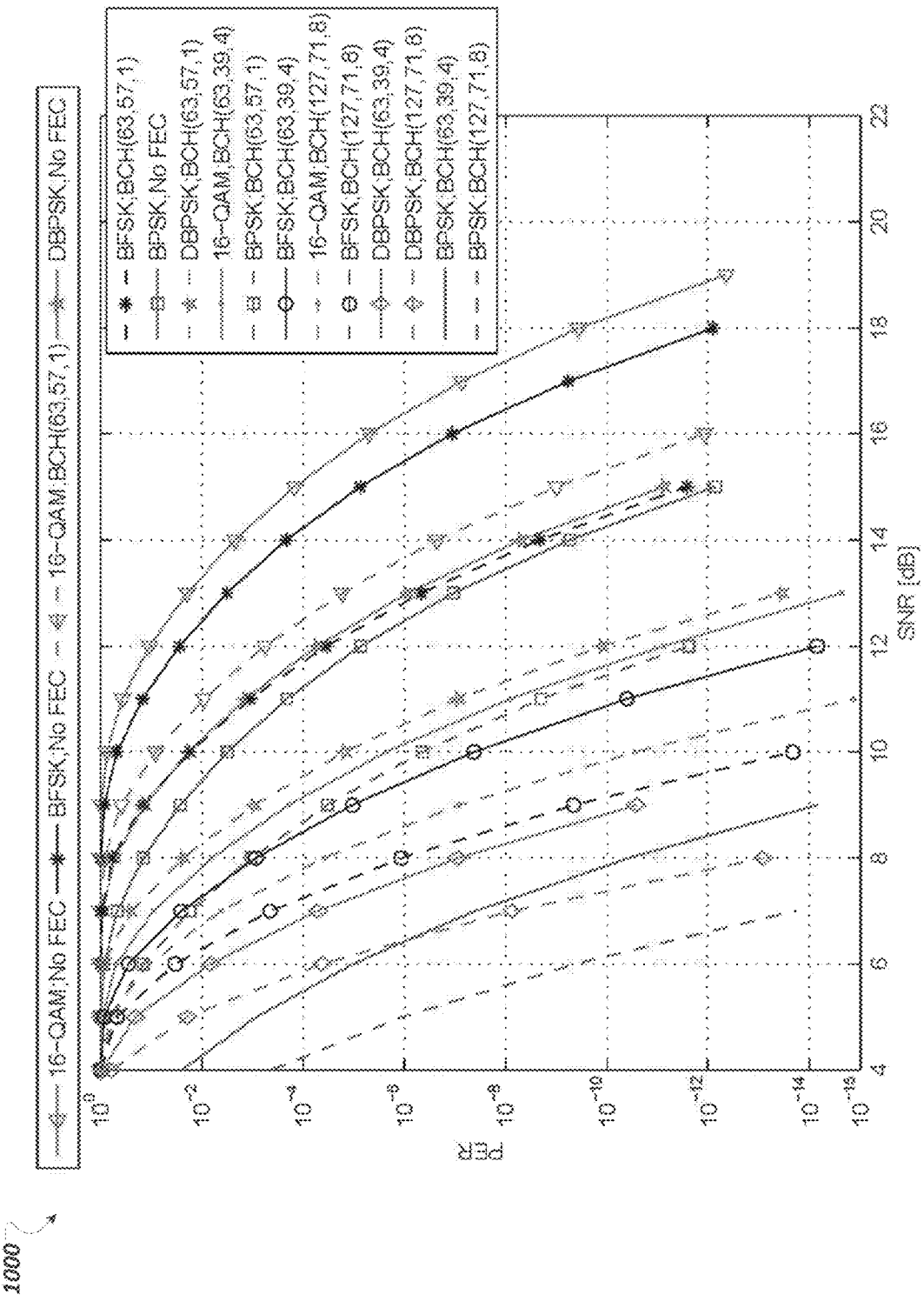
FIG. 10 is a plot showing example effects of typical underground modulation and channel coding on packet error rate (PER) of MI communications in WSUNs.

In some implementations, a two-phase decision procedure 730 can be performed to enable the favored geographical routing to leverage its scalability and limited signaling overhead, which is well-suited for underground oil reservoir environment. The two-phase decision procedure 730 decides the optimal transmission parameters for all possible forwarders and then determines the optimal forwarder, for example, which provides the optimal energy consumption and achievable throughput. More specifically, the two phases include a link quality examination phase and a next-hop selection phase. For the link quality examination phase, the transmit power level, the allowed link throughput, the code length of DS-CDMA can be optimized through processes 710 and 720 with respect to all feasible next-hop neighbors and all possible combinations of modulation and channeling coding functionalities. FIG. 10 lists a set of possible functionalities. Then, for next-hop selection phase, the best next-hop and the functionalities associated with the best link quality result can be selected. Actual transmissions can take place between the selected transmitter-receiver pair.

In some implementations, random access scheme 740 can be performed whenever the actual transmission is failed. The random access scheme 740 can include a retransmission after some random or specific waiting time. The random access scheme 740 supplements DEAP and guarantees successful transmissions between transmitter sensor and receiver sensor. Several well-known random access schemes can be applied here, such as ALOHA, slotted-ALOHA, Carrier sense multiple access (CSMA), etc. The random access scheme 740 can be performed to guarantee the reliable communications for loss-tolerance purposes.

Simulations have been performed to evaluate the performance of the example cross-layer protocol framework. In particular, the MI-based channel modeling is first evaluated through the simulations on 3-dB bandwidth and path loss, with respect to different temperatures and coil directions. Furthermore, the effects of typical underground modulation and channel coding on packet error rate (PER) are evaluated based on the built channel modeling. A comprehensive evaluation of the example cross-layer communication protocol framework, that is, the DEAP framework, is conducted with practical setting of system parameters in underground oil reservoirs. Remarkable energy savings and high throughput gain have been shown. The DEAP framework can be favored by practical implementations in WUSNs.

To provide satisfactory cross-layer design for practical underground oil reservoir, the cross-layer framework is able to optimize the corresponding transmission parameters by capturing the unique impacts of environment parameters, which can be shown in FIGS. 8 and 9 below, respectively.

Figure 8:
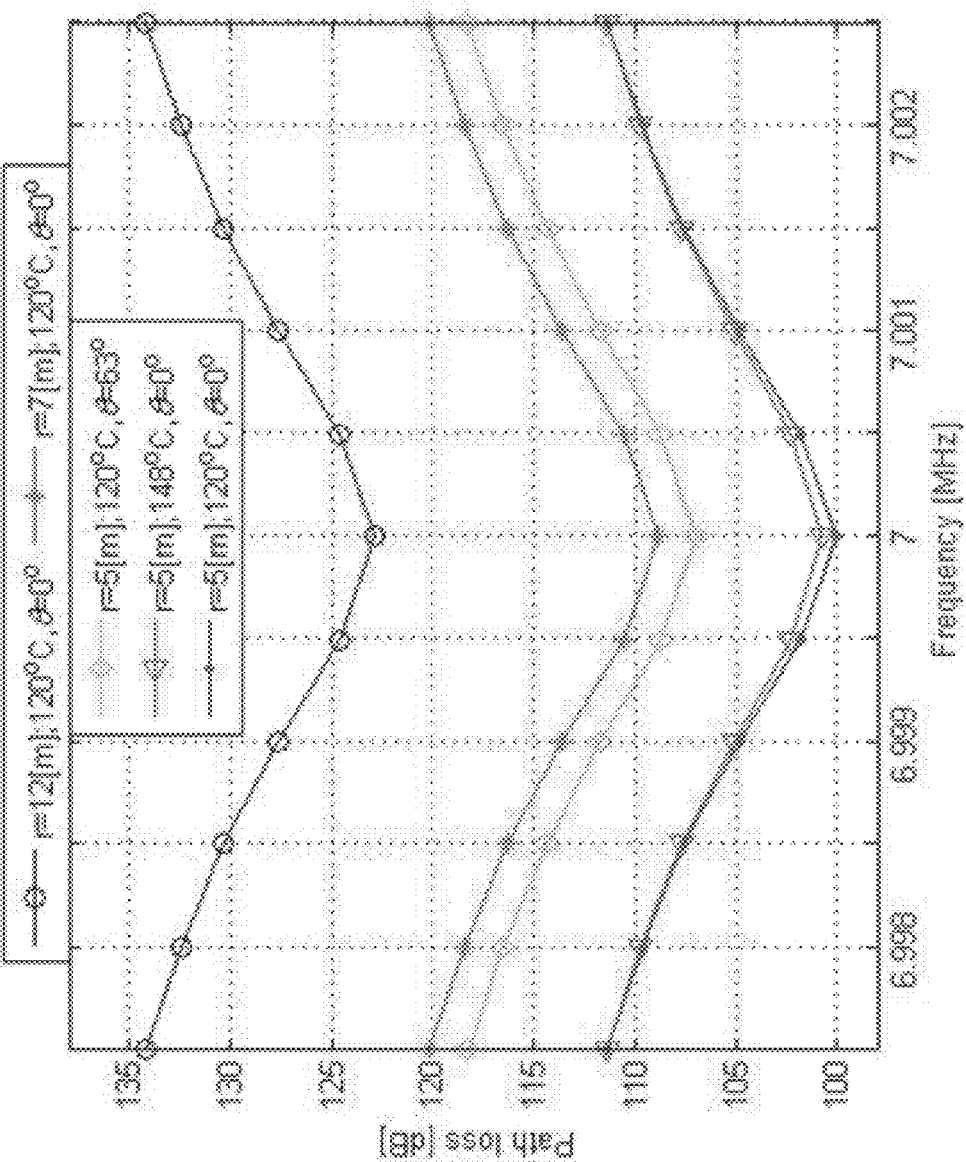
FIG. 8 is a plot showing example frequency response for available 3-dB bandwidth of Magnetic Induction (MI)-based communications with different transmission ranges, working temperatures, and alignment angles of transceiver coils.

FIG. 8 is a plot 800 showing example frequency responses of MI channels in the oil reservoir environment. The plot 800 shows path losses (in dB) of MI-based communications with different transmission ranges, working temperatures, and alignment angles of transceiver coils. It is shown that the 3-dB bandwidth is around 1 KHz and is not affected by the transmission range and the alignment angles.

Figure 9:
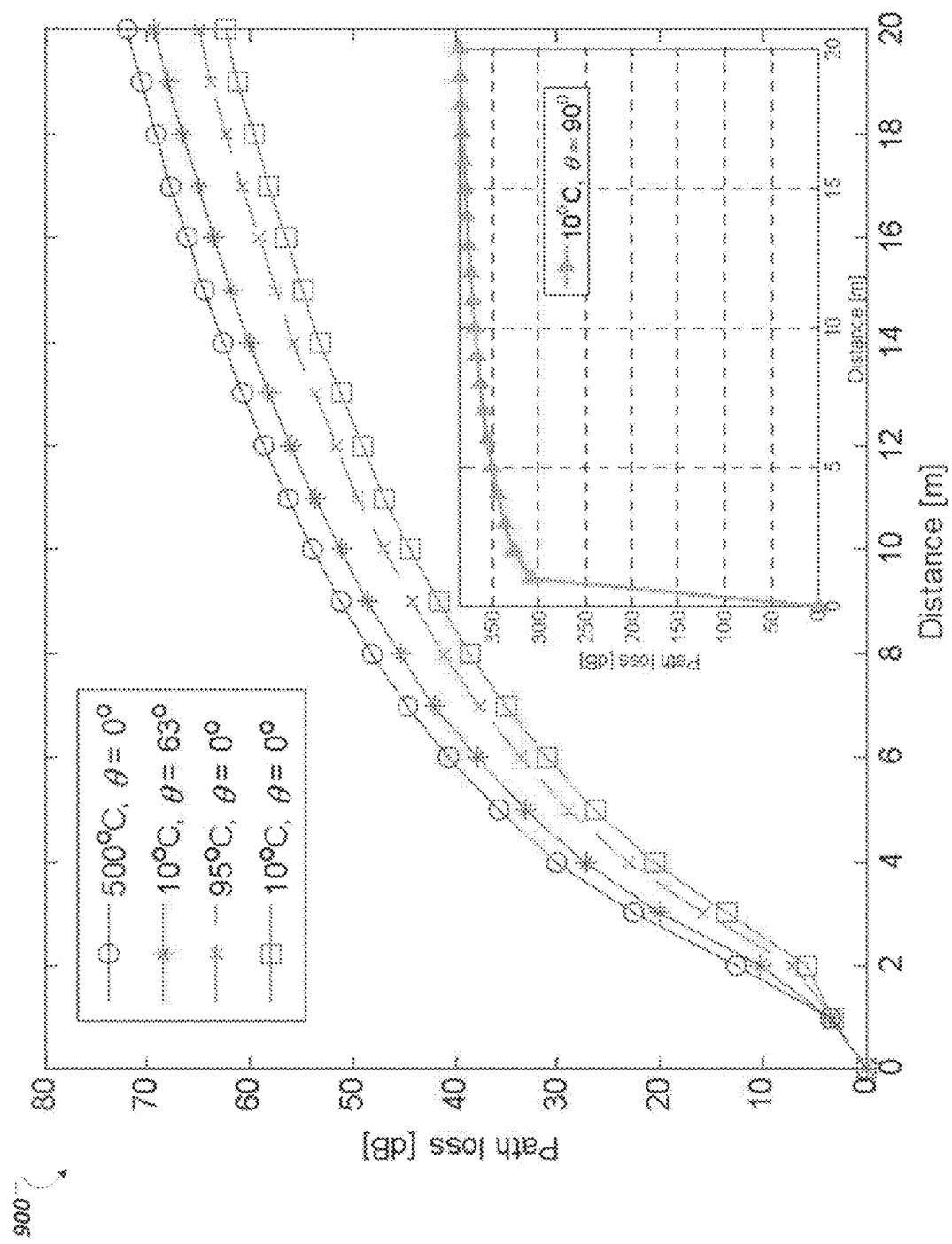
FIG. 9 is a plot showing example effects of temperature and coil direction on path loss of MI-based communications.

FIG. 9 is a plot 900 showing example effects of temperature and coil direction on path loss of MI-based communications. The plot 800 shows path losses (in dB) of a single transmitter-receiver pair with respect to the transmission distance under different temperatures and coil directions. As the temperature goes higher, the path loss increases and thus degrades the link transmission qualities. The cross-layer framework can capture such environment-dependent bandwidth and path loss behavior because, in the cross-layer protocol framework, communication parameters will be adjusted according to the changes of both link data rate and SINR value, which are the functions of environment parameters of underground oil reservoir.

MI communications enjoy less channel variations than EM waves. The undesired noise, mainly from the thermal vibration of circuit elements, justifies its modeling as additive white Gaussian noise. The modulation and channel coding functionalities are analyzed in view of the characteristics of MI communications. For example, due to energy-limited WUSNs, more sophisticated modulation techniques bring much energy consumption. Several simple and suitable modulation schemes, such as BPSK, BFSK, DBPSK, and 16-QAM, can be selected for the wireless underground communications. On the other hand, regarding the channel coding schemes, forward error correction (FEC) enhances the link transmission reliability without additional re-transmission cost and overhead, while the automatic repeat request (ARQ) does. Furthermore, along with high energy efficiency, block codes have lower complexity as compared to convolutional codes (CC). In particular, a multilevel cyclic BCH (Bose, Ray-Chaudhuri, Hocquenghem) code outperforms the most energy-efficient CC by almost 15% for the optimal packet size in wireless sensor networks. Thus, BCH code can be used in the cross-layer protocol framework; however, the cross-layer framework can be extended to support additional or different energy-consuming schemes, such as Reed-Solomon codes, CCs, turbo codes as well as different types of ARQ.

FIG. 10 is a plot 1000 showing example PER curves of different combinations of modulation and channel coding schemes, showing effects of modulation and channel coding on PER of MI communications in WSUNs.

FIG. 11 is a table 1100 showing example parameter setup for comparison between proposed cross-layer DEAP framework and the layered BPSK/No FEC scheme under various environmental conditions in underground oil reservoir environment.

Figure 12:
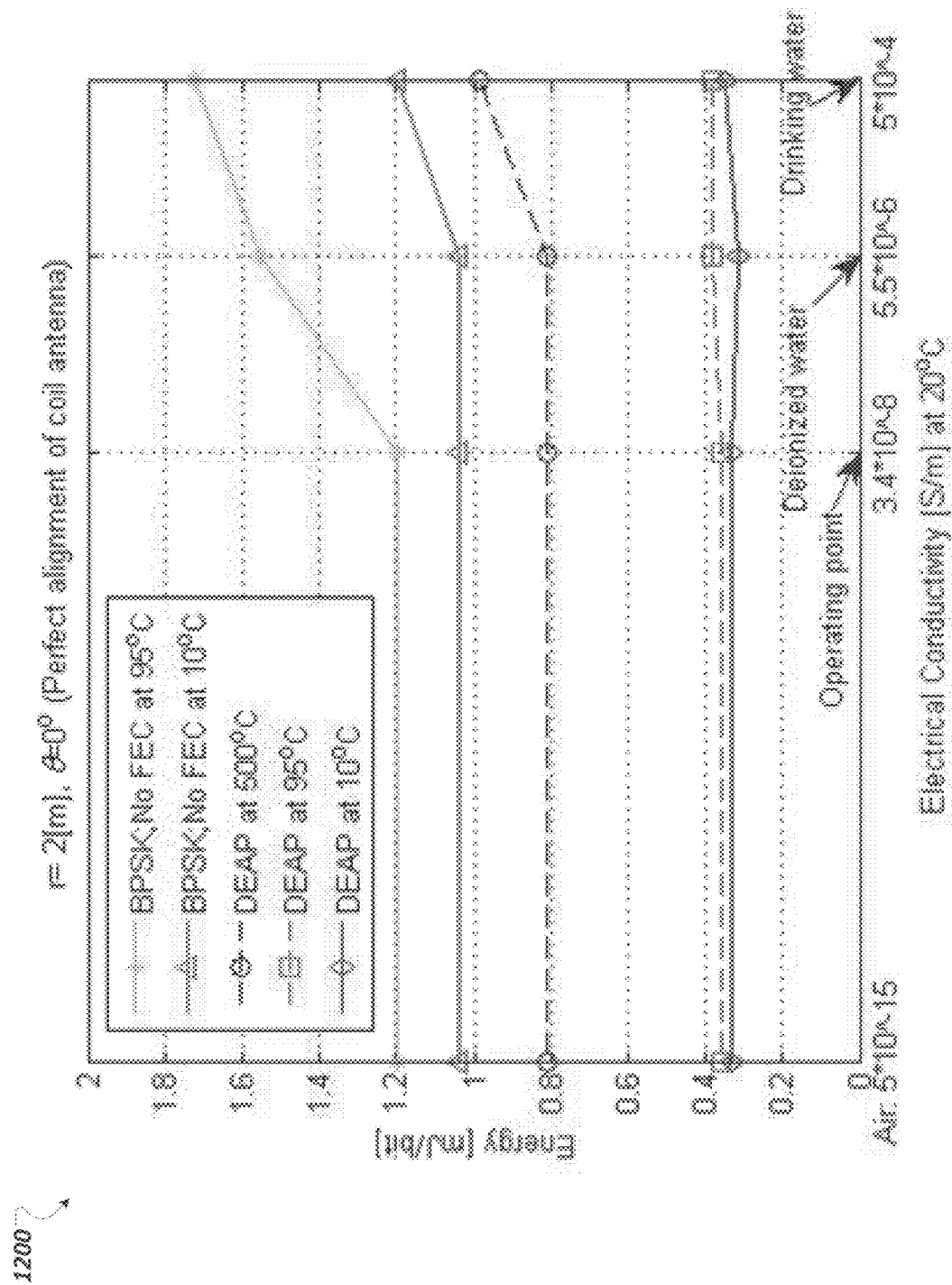
FIG. 12 is a plot showing example energy consumptions of the example framework cross-layer and the layered BPSK/No FEC scheme under different environmental conditions.
Figure 13:
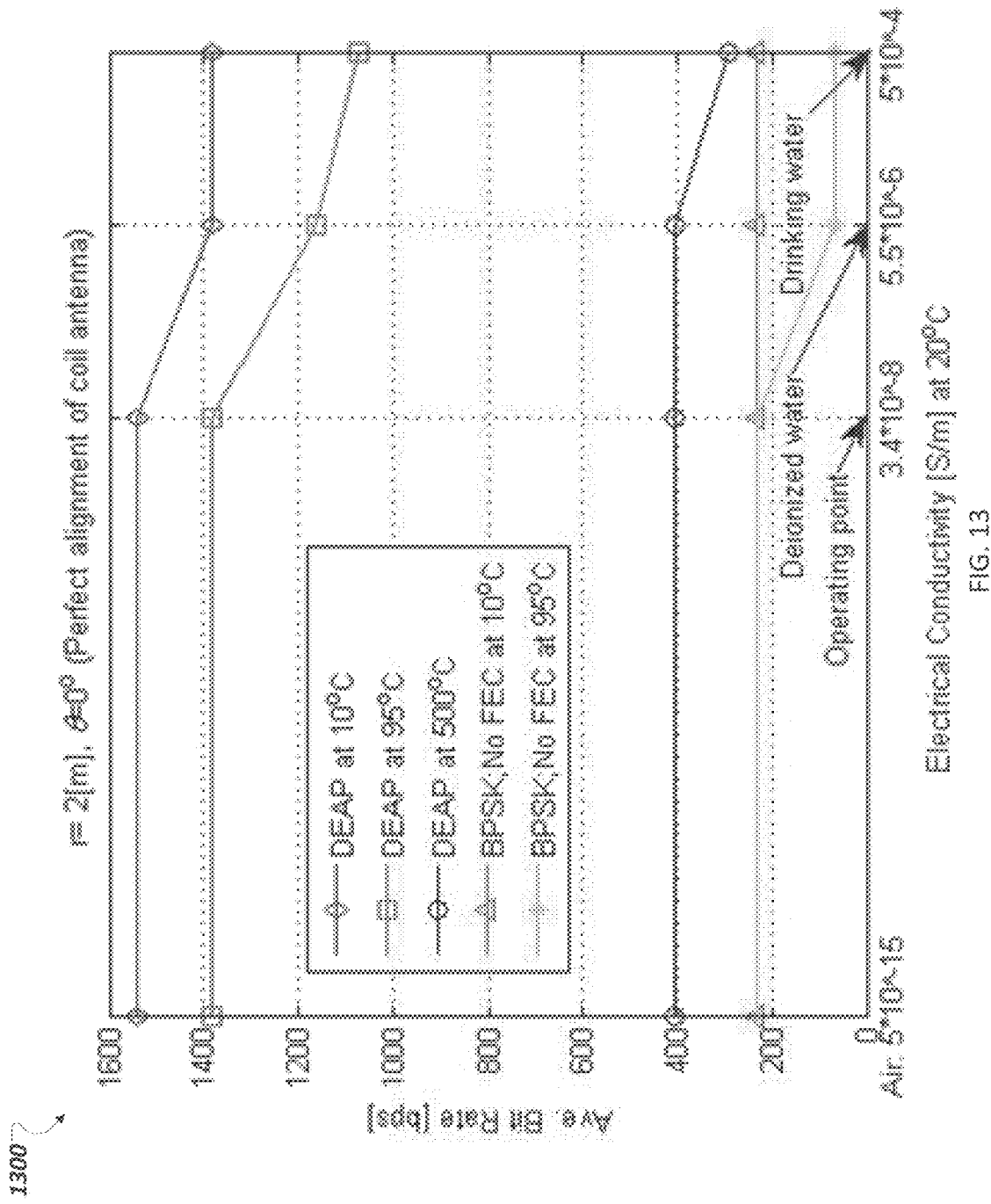
FIG. 13 is a plot showing example average bit rates of the example cross-layer framework and the layered BPSK/No FEC scheme under different environmental conditions.

FIG. 12 is a plot 1200 showing example energy consumption of the DEAP framework and the layered BPSK/No FEC scheme under different environmental conditions. FIG. 13 is a plot 1300 showing example average bit rates of the DEAP framework and the layered BPSK/No FEC scheme under different environmental conditions. As the temperature and electrical conductivity increase, the energy consumption increases and the achievable bit rate decreases. The DEAP framework outperforms the other scheme in all kinds of environmental conditions. In particular, while BPSK/No FEC scheme cannot work at 500° C. for all kinds of medium conductivities, the DEAP framework still functions well in such scenarios.

The DEAP framework is further evaluated for the underground environment with very high medium conductivity (for example, 4.8 [S/m] sea water at room temperature 20° C.). The detailed results are shown in Table 1400 in FIG. 14. Table 1400 shows example performance evaluation of the DEAP framework under sea water condition in underground oil reservoirs, where transmission range is set as 0.68 [m] with perfect alignment of coil antenna. Such a scenario causes dramatic degradation for the MI-based transmission quality, as the basic MI concept is to exploit the signal induction. Only DEAP framework can work in this harsh condition for the very short transmission range (0.68 [m] in this case). Furthermore, with temperature increases for sea water condition, the energy consumption decreases and the achievable bit rate increases, which provide better system performance. The opposite effect due to temperature differences comes from the reason that the impact of temperature increasing becomes non-negligible anymore, regarding such a high conductivity value at room temperature.

The operations described in this disclosure can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be deployed to be executed on one computer or on multiple computers that are located at one site or distributed across multiple sites and interconnected by a communication network.

While this disclosure contains many specific implementation details, these should not be construed as limitations on the scope of any implementations or of what may be claimed, but rather as descriptions of features specific to particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described previously as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described previously should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A system comprising:
a plurality of sensors in a wireless underground sensor network (WUSN) in an underground region, wherein each of the plurality of sensors comprises:
at least one processor; and
a non-transitory computer-readable storage medium coupled to the at least one processor and storing programming instructions for execution by the at least one processor, the programming instructions instruct the at least one processor to perform operations comprising:
identifying a plurality of environment-dependent parameters measured by the plurality of sensors;
identifying respective communication functions for a plurality of layers of a protocol stack for magnetic induction (MI) communications among the plurality of sensors in the WUSN in the underground region;
identifying an optimization problem for jointly optimizing the respective communication functions of the plurality of layers of the protocol stack based on the plurality of environment-dependent parameters, the optimization problem including a plurality of transmission parameters defining the respective communication functions of the plurality of layers of the protocol stack;
determining the plurality of transmission parameters by solving the optimization problem; and
transmitting based on magnetic induction, signals using the plurality of transmission parameters defining the respective communication functions of the plurality of layers of the protocol stack.

2. The system of claim 1, wherein the protocol stack is a three-layer protocol stack that includes a physical layer, a data link layer, and a network layer.

3. The system of claim 2, wherein identifying a communication function for each layer of a protocol stack comprises:
identifying a direct sequence code division multiple access (DS-CDMA) scheme as a multiple access scheme for the data link layer; and
identifying a geographic routing algorithm as a routing scheme for the network layer.

4. The system of claim 3, wherein solving the optimization problem comprises one or more of:
performing a distributed power control based on a non-cooperative game theory;
evaluating a relation between a chaotic code of the DS-CDMA scheme and a link throughput for the data link layer of the protocol stack; or
identifying a forwarder for a transmitter of a transceiver coil pair according to the geographic routing algorithm by performing a two-phase decision process.

5. The system of claim 1, wherein the plurality of environment-dependent parameters comprises a temperature, an electrical conductivity, a magnetic permeability, and a coil resistance.

6. The system of claim 1, wherein the operations further comprise evaluating effects of the plurality of environment-dependent parameters on quality of the MI communications among the plurality of sensors in the underground region.

7. The system of claim 1, wherein the transmission parameters comprises one or more of a modulation scheme, a coding scheme, a transmitted power level, a data rate, a coding length of chaotic code, or a next-hop packet forwarder.

8. The system of claim 1, wherein the optimization problem further comprises one or more communication constraints based on a quality of service requirement, a power control requirement, or both.

9. The system of claim 1, wherein the optimization problem comprises a multi-objective optimization problem, an application-driven optimization problem, or a combination of a multi-objective optimization problem and an application-driven optimization problem by a weight sum.

10. The system of claim 1, wherein the optimization problem comprises one or more optimization objectives that comprise a minimum energy consumption, a maximum network throughput, or both.

11. The system of claim 1, wherein the operations further comprise performing a random access scheme when the transmitting of the signals fails.

* * * * *